United States Patent [19]

Magol et al.

[11] Patent Number: 4,904,286

[45] **Date of Patent: * Feb. 27, 1990**

[54] CYCLONE SEPARATOR HAVING WATER-STEAM COOLED WALLS

[75] Inventors: Byram J. Magol, Covent Station; John D. Fay, Randolph; Michael Garkawe, Madison, all of N.J.

[73] Assignee: Foster Wheeler Energy Corporation, Clinton, N.J.

[ * ] Notice: The portion of the term of this patent subsequent to May 24, 2005 has been disclaimed.

[21] Appl. No.: 179,818

[22] Filed: Apr. 11, 1988

Related U.S. Application Data

[63] Continuation-in-part of Ser. No. 69,930, Jul. 6, 1987, Pat. No. 4,746,337.

[51] Int. Cl.[4] .............................................. B01D 45/12

[52] U.S. Cl. ...................................................... 55/269

[58] Field of Search .................................. 55/269, 268

[56] References Cited

U.S. PATENT DOCUMENTS 4,746,337 5/1988 Magol et al. .......................... 55/269

FOREIGN PATENT DOCUMENTS 587240 4/1947 United Kingdom .................. 55/269

*Primary Examiner*—Bernard Nozick

*Attorney, Agent, or Firm*—Marvin A. Naigur; Warren B. Kice

[57] ABSTRACT

A cyclone separator in which an outer cylinder is formed by a plurality of vertically-extending, spaced, parallel tubes and extends around an inner pipe in a coaxial relationship therewith to define an annular chamber. A portion of the tubes forming the outer cylinder are bent out of the plane of the cylinder to form an inlet opening in a tangential relationship to the annular chamber for receiving gases containing solid particles and directing same through the annular chamber for separating the solid particles from the gas by centrifugal forces. The tubes are bent radially inwardly towards the inner pipe and radially outwardly to form a roof for the annular chamber.

7 Claims, 1 Drawing Sheet

CYCLONE SEPARATOR HAVING WATER-STEAM COOLED WALLS

CROSS-REFERENCE TO RELATED APPLICATION

This application is a continuation-in-part of Applicant's co-pending application S.N. 069,930 filed July 6, 1987 now U.S. Pat. No. 4,746,337.

BACKGROUND OF THE INVENTION

This invention relates to a cyclone separator and, more particularly, to such a separator for separating solid fuel particles from gases discharged from a combustion system or the like.

Conventional cyclone separators are normally provided with a monolithic external refractory wall which is abrasion resistant and insulative so that the outer casing runs relatively cool. Typically, these walls are formed by an insulative refractory material sandwiched between an inner hard refractory material and an outer metal casing. In order to achieve proper insulation, these layers must be relatively thick which adds to the bulk, weight, and cost of the separator. Also, the outside metal casing of these designs cannot be further insulated from the outside since to do so could raise its temperature as high as 1500° F. which is far in excess of the maximum temperature it can tolerate.

Further, most conventional cyclone separators require relatively expensive, high temperature, refractory-lined ductwork and expansion joints between the reactor and the cyclone, and between the cyclone and the heat recovery section, which are fairly sophisticated and expensive. Still further, conventional separators formed in the above manner require a relatively long time to heat up before going online to eliminate premature cracking of the refractory walls, which is inconvenient and adds to the cost of the process. Also, other cyclone separators may require a separate roof tube circuit which still further adds to the cost of the system.

SUMMARY OF THE INVENTION

It is therefore an objective of the present invention to provide a cyclone separator in which heat losses are reduced and the requirement for internal refractory insulation is minimized.

It is a still further object of the present invention to provide a cyclone separator of the above type in which the bulk, weight and cost of the separator are much less than that of conventional separators.

It is a still further object of the present invention to provide a cyclone separator of the above type in which the need for expensive, high-temperature, refractory-lined ductwork and expansion joints between the furnace and the cyclone separator and between the latter and the heat recovery section are minimized.

Toward the fulfillment of these and other objects, the separator of the present invention includes an outer cylinder and an inner pipe disposed in a coaxial, spaced relationship to define an annular chamber for receiving gases having solid particles entrained therein. The outer cylinder comprises a plurality of tubes extending vertically in a parallel relationship for at least a portion of their lengths, and ring headers are provided at the ends of the cylinder formed by the tubes to pass cooling water, or steam, through the tubes. A portion of the tubes are bent from the plane of the outer cylinder to form an inlet opening in a tangential relationship to the annular chamber for receiving the gases containing the solid particles. The mixture of gases and solid particles are directed through the annular chamber for separating the solid particles from the gases by centrifugal forces, whereby the solid particles fall to the lower portion of the outer cylinder for disposal, or recycle, and the gases pass upwardly through the inner pipe to external heat recovery equipment. The tubes forming the outer cylinder are bent radially inwardly towards the inner pipe and radially outwardly to form a roof for the annular chamber.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
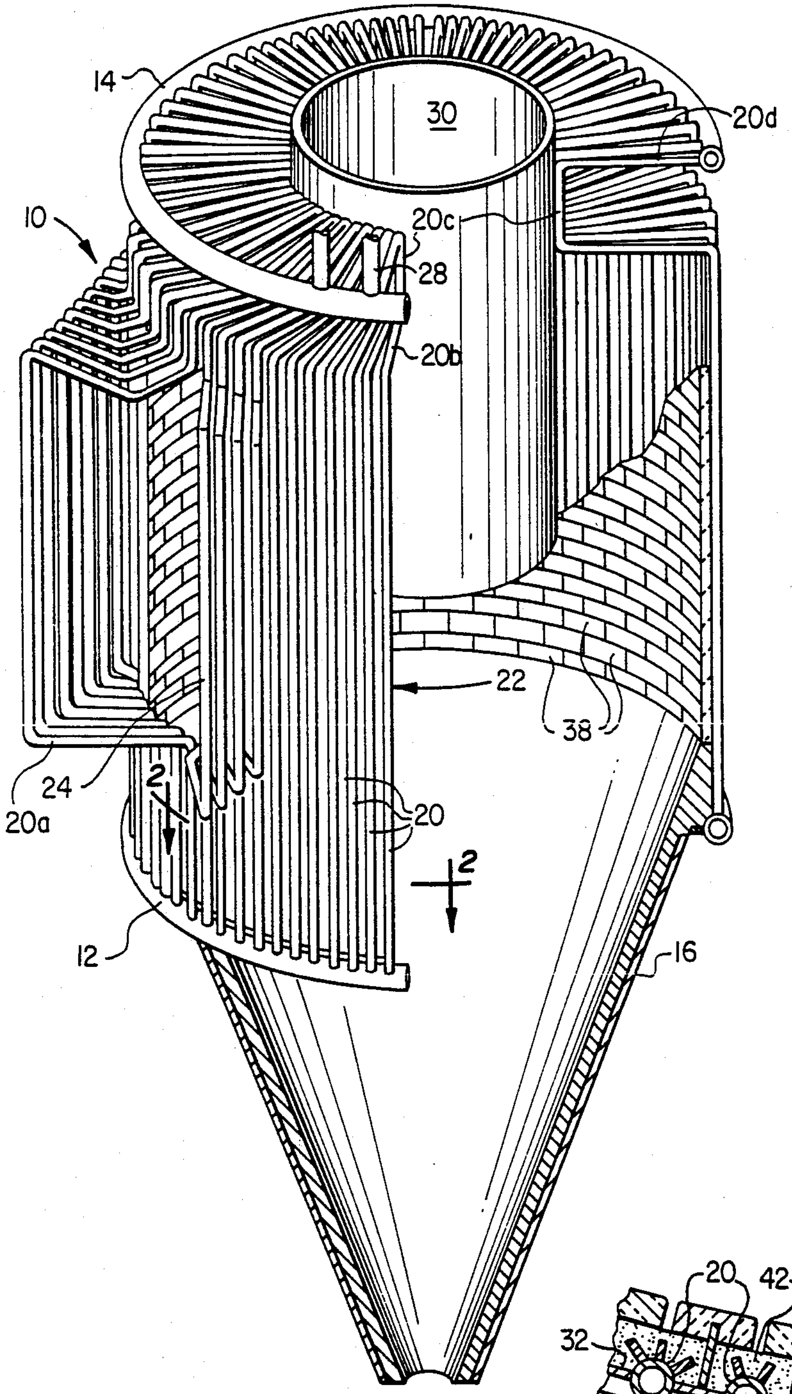
FIG. 1 is a perspective/schematic view of the cyclone separator of the present invention showing only the tubes forming the outer cylinder.

Referring to FIG. 1 of the drawings, the reference numeral 10 refers in general to the cyclone separator of the present invention which includes a lower ring header 12 and an upper ring header 14. The header 12 extends immediately above, and is connected to, a hopper 16 disposed at the lower portion of the separator 10.

A group of vertically-extending, spaced, parallel tubes 20 are connected at their lower ends to the header 12 and extend vertically for the greater parts of their lengths to form a right circular cylinder 22.

A portion of the tubes 20 are bent out of the plane of the cylinder 22, as shown by the reference numerals 20*a*, to form an inlet passage 24 to the interior of the cylinder for reasons that will be described.

At the upper end of the cylinder 22 the tubes 20 are bent radially inwardly as shown by the reference numeral 20*b*, and then upwardly as shown by the reference numeral 20*c* to define a circular opening which, of course, is of a diameter less than that of the diameter of the cylinder 22. The tubes 20 are then bent radially outwardly as shown by the reference numeral 20*d*, with their respective ends being connected to the upper header 14. The tube portions 20*b* thus form a roof for the cyclone.

A plurality of vertical pipes 28 extend upwardly from the upper header 14, it being understood that the lower header 12 can be connected to a source of cooling fluid, such as water, or steam, which passes from the header 12, through the tubes 20, and into the upper header 14 before being discharged, via the pipes 28, to external equipment. The direction of flow for the cooling fluid could also be reversed.

An inner pipe, or barrel, 30 is disposed within the cylinder 22, is formed from a solid, metallic material, such as stainless steel, and has an upper end portion extending slightly above the plane formed by the header 14 and the upper tube portions 20*d*. The pipe 30 extends immediately adjacent the tube portions 20*c*, and its length approximately coincides with the inlet passage formed by the bent tube portions 20*a*. Thus, an annular passage is formed between the outer surface of the pipe 30 and the inner surface of the cylinder 22, for reasons that will be described, and the tube portions 20*b* form a roof for the chamber.

Figure 2:
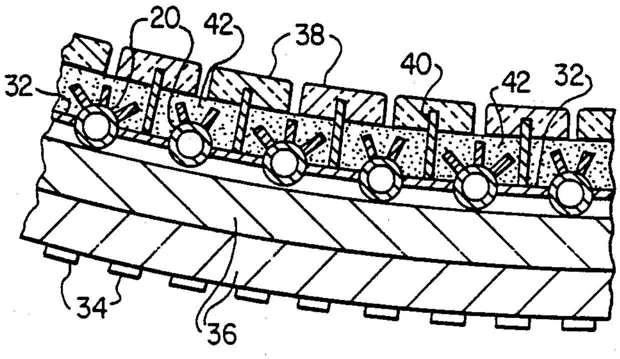
FIG. 2 is an enlarged, cross-sectional view taken along the portion of the wall of the outer cylinder of FIG. 1 designated by the line 2—2, and showing the insulative materials surrounding the tubes.

The tubes 20 are disposed between an insulative material and an erosion preventing structure which are omitted from FIG. 1 for the convenience of presentation but which are shown in FIG. 2. More particularly, a fin 32 is welded to, and extends from, the adjacent walls of each pair of adjacent tubes 20. A lagging, or panel 34 of a lightweight material, such as aluminum, is provided in a slightly spaced relationship to the plane of the tubes 20, and a heat insulative material 36 is disposed between the outer surface of the tubes 20 and the inner wall of the lagging 34. A plurality of tiles 38 extend adjacent the inner wall of the cylinder 22 and are connected by anchors 40 extending from the fins 32. A layer of refractory 42 is placed between the tiles 38 and the tubes 20.

It is understood that an upper hood, or the like (not shown), preferably rectangular in cross section, can be provided above the plane formed by the upper header 14 and the tube portions 20*d* and can be connected to the pipe 30 by a plurality of conical plates or the like (not shown). The hood can be top supported from the roof of the structure in which the separator 10 is placed and the remaining portion of the separator can be supported from hangers connected to header 14, or pipes 28.

In operation, and assuming the separator 10 of the present invention is part of a boiler system including a fluidized bed reactor, or the like, disposed adjacent the separator, the inlet passage 24 formed by the bent tube portions 20*a* receives hot gases from the reactor which gases contain entrained fine solid particulate fuel material from the fluidized bed. The gases containing the particulate material thus enter and swirl around in the annular chamber defined between the cylinder 22 and the inner pipe 30, and the entrained solid particles are propelled by centrifugal forces against the inner wall of the cylinder 22 where they collect and fall downwardly by gravity into the hopper 16. The relatively clean gases remaining in the annular chamber are prevented from flowing upwardly by the roof formed by the tube portions 20*b* and their corresponding fins 32, and thus enter the pipe 30 through its lower end. The gases thus pass through the length of the pipe before exiting from the upper end of the pipe to the aforementioned hood, or the like, for directing the hot gases to external equipment for further use.

Water, or steam from an external source is passed into the lower header 12 and passes upwardly through the tubes 20 before exiting, via the upper header 14 and the pipes 28, to external circuitry which may form a portion of the boiler system including the separator 10. The water thus maintains the wall of cylinder 22 at a relatively low temperature.

Several advantages result from the foregoing arrangement. For example, the separator of the present invention reduces heat losses and minimizes the requirement for internal refractory insulation. Also, the bulk, weight, and cost of the separator of the present invention is much less than that of conventional separators. The separator of the present invention also minimizes the need for expensive high temperature refractory-lined ductwork and expansion joints between the reactor and cyclone separator, and between the latter and the heat recovery section. Still further, by utilizing the tube portions 20*b* to form a roof for the annular chamber between the cylinder 22 and the pipe 30, the requirement for additional roof circuitry is eliminated.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention therein.

What is claimed is:

1. A cyclone separator comprising an inner cylinder, an outer cylinder extending around said inner cylinder in a coaxial relationship to define an annular chamber between the two cylinders, said outer cylinder comprising a plurality of tubes extending vertically and circumferentially in a parallel relationship for at least a portion of their lengths, a first ring header connected to the upper ends of said tubes and a second ring header connected to the lower ends of said tubes for circulating a cooling fluid through said outer cylinder, means for directing gases containing solid particles through said annular chamber for separating the solid particles from said gases by centrifugal forces, the separated gases exiting through said inner cylinder and the separated solids falling to the bottom of said outer cylinder for disposal or recycle, the upper end portions of said tubes being bent radially inwardly towards said inner cylinder and radially outwardly to form a roof for said annular chamber, and means for passing water or steam or a steam and water mixture through said ring headers and said tubes to cool said outer cylinder.

2. The separator of claim 1 wherein said outwardly bent portions of said tubes extend from said inner cylinder to the wall of said outer cylinder to form said roof.

3. The separator of claim 1 wherein said tubes are disposed in a spaced relationship.

4. The separator of claim 1 further comprises a continuous fin extending from corresponding portions of adjacent tubes to form a gas tight structure.

5. The separator of claim 1 further comprising refractory means extending around the inner surface of said outer cylinder and insulation around said outer surface of outer cylinder.

6. The separator of claim 1 wherein said directing means is formed by a portion of said tubes bent from the plane of the outer cylinder to form an inlet opening for receiving said gasses.

7. The separator of claim 1 further comprising a fin extending between said adjacent pair of tubes, a plurality of tiles extending in a spaced relation to said tubes, means connecting said tiles to said fins, and refractory means extending between said fins and said tiles.

* * * * *

US004904286B1

REEXAMINATION CERTIFICATE (1749th)

United States Patent [19]

[11] B1 4,904,286

Magol et al.

[45] Certificate Issued * Jul. 14, 1992

[54] CYCLONE SEPARATOR HAVING WATER-STEAM COOLED WALLS

[75] Inventors: Byram J. Magol, Covent Station; John D. Fay, Randolph; Michael Garkawe, Madison, all of N.J.

[73] Assignee: Foster Wheeler Energy Corporation, Clinton, N.J.

Reexamination Request:
No. 90/002,428, Sep. 3, 1991

Reexamination Certificate for:

| | |
|---|---|
| Patent No.: | **4,904,286** |
| Issued: | **Feb. 27, 1990** |
| Appl. No.: | **179,818** |
| Filed: | **Apr. 11, 1988** |

[ * ] Notice: The portion of the term of this patent subsequent to May 24, 2005 has been disclaimed.

Related U.S. Application Data

[63] Continuation-in-part of Ser. No. 69,930, Jul. 6, 1987, Pat. No. 4,746,337.

[51] Int. Cl.$^5$ .......... B01D 45/12

[52] U.S. Cl. .......... 55/269

[58] Field of Search .......... 55/268, 269; 165/119; 110/245; 122/4 D

[56] References Cited

U.S. PATENT DOCUMENTS

| | | | |
|---|---|---|---|
| 1,890,170 | 12/1932 | Van Brunt | 122/235.12 |
| 2,437,294 | 3/1948 | Dalin | 55/269 |
| 2,937,141 | 5/1960 | Helwig | 203/361 |
| 3,327,456 | 6/1967 | Guber, Jr. et al. | 55/269 |
| 3,470,678 | 10/1969 | Clark et al. | 55/269 |
| 3,732,920 | 5/1973 | Kimmel | 165/119 |
| 4,615,715 | 10/1986 | Seshamani | 55/269 |
| 4,746,337 | 5/1988 | Magol et al. | 55/269 |
| 4,880,450 | 11/1989 | Magol et al. | 55/269 |
| 4,913,711 | 4/1990 | Stewart | 55/269 |

FOREIGN PATENT DOCUMENTS

| | | | |
|---|---|---|---|
| 2527478 | 12/1983 | France . | |
| 54-91602 | 7/1979 | Japan . | |
| 57-35857 | 2/1982 | Japan . | |
| 437124 | 2/1985 | Sweden . | |
| 709182 | 1/1980 | U.S.S.R. . | |
| 567450 | 2/1945 | United Kingdom . | |
| 587240 | 4/1947 | United Kingdom | 55/269 |
| 641357 | 8/1950 | United Kingdom . | |

*Primary Examiner*—Bernard Nozick

[57] ABSTRACT

A cyclone separator in which an outer cylinder is formed by a plurality of vertically-extending, spaced, parallel tubes and extends around an inner pipe in a coaxial relationship therewith to define an annular chamber. A portion of the tubes forming the outer cylinder are bent out of the plane of the cylinder to form an inlet opening in a tangential relationship to the annular chamber for receiving gases containing solid particles and directing same through the annular chamber for separating the solid particles from the gas by centrifugal forces. The tubes are bent radially inwardly towards the inner pipe and radially outwardly to form a roof for the annular chamber.

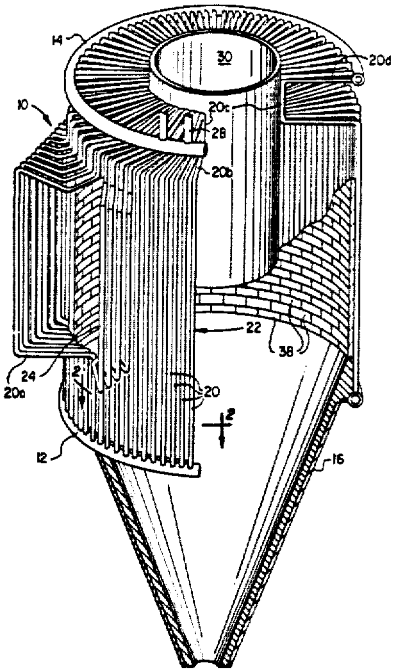

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4, 7 is confirmed.

Claim 1 is cancelled.

Claims 2, 3, 5, 6 are determined to be patentable as amended.

New claims 8-16 are added and determined to be patentable.

2. The separator of claim [1] *4 or 7 or 8 or 9 or 12* wherein said outwardly bent portions of said tubes extend from said inner cylinder to the wall of said outer cylinder to form said roof.

3. The separator of claim [1] *4 or 7 or 8 or 9 or 12* wherein said tubes are disposed in a spaced relationship.

5. The separator of claim [1] *4 or 7 or 8 or 9 or 12* further comprising refractory means extending around the inner surface of said outer cylinder and insulation around said outer surface of *said* outer cylinder.

6. The separator of claim [1] *4 or 7 or 8 or 9 or 12* wherein said directing means is formed by a portion of said tubes bent from the plane of the outer cylinder to form an inlet opening for receiving said [gasses] *gases.*

*8. The separator of claim 1 wherein said inner cylinder is disposed so that an upper portion of said inner cylinder extends above a plane formed by said first ring header.*

*9. The separator of claim 1 further comprising means secured to an upper portion of said separator for supporting said separator from above.*

*10. The separator of claim 9 wherein said means for supporting said separator from above is secured to said first ring header.*

*11. The separator of claim 10 wherein said means for supporting said separator from above comprises a plurality of tubes extending upwardly from said first ring header.*

*12. The separator of claim 1 wherein said first ring header is coaxially aligned with said second ring header.*

*13. The separator of claim 8 or 9 or 12 further comprising a continuous fin extending from corresponding portions of adjacent tubes to form a gas tight structure.*

*14. The separator of claim 8 or 9 or 12 further comprising a fin extending between said adjacent pair of tubes, a plurality of tiles extending in a spaced relationship to said tubes, means connecting said tiles to said fins, and refractory means extending between said fins and said tiles.*

*15. The separator of claim 1 wherein said first ring header extends above said outer cylinder and in coaxial alignment with both of said cylinders.*

*16. The separator of claim 15 wherein each of said bent upper end portions of said tubes includes a horizontal portion extending from said outer cylinder to said inner cylinder, a vertical portion engaging a corresponding portion of said inner cylinder along the length of said vertical portion and another horizontal portion extending from said inner cylinder to said ring header.*

* * * * *